United States Patent [19]

Nakamura et al.

[11] Patent Number: 4,738,459
[45] Date of Patent: Apr. 19, 1988

[54] VEHICLE WITH FOUR-WHEEL STEERING DEVICE

[75] Inventors: Kenji Nakamura; Noriyasu Furuichi, both of Saitama, Japan

[73] Assignee: Honda Giken Kogyo Kabushiki Kaisha, Tokyo, Japan

[21] Appl. No.: 764,434

[22] Filed: Aug. 9, 1985

[30] Foreign Application Priority Data

| Aug. 9, 1984 | [JP] | Japan | 59-167101 |
| Aug. 9, 1984 | [JP] | Japan | 59-167102 |
| Sep. 14, 1984 | [JP] | Japan | 59-193322 |

[51] Int. Cl.$^4$ ............................................. B62D 5/06
[52] U.S. Cl. ..................................................... 280/91
[58] Field of Search ................. 280/91; 180/79, 79.1, 180/79.3, 140, 146, 147, 151, 155

[56] References Cited

U.S. PATENT DOCUMENTS

| 679,669 | 7/1901 | Franz | 280/91 |
| 1,028,866 | 6/1912 | Eadie | 280/91 |
| 3,103,985 | 9/1963 | Price, Jr. | 280/91 |
| 3,110,352 | 11/1963 | McClarnon | 280/91 |
| 3,400,778 | 9/1968 | Hand | 280/91 |
| 3,596,730 | 8/1971 | Cecce | 280/91 |
| 4,313,514 | 2/1982 | Furukawa et al. | 280/91 |

FOREIGN PATENT DOCUMENTS

294015 4/1954 Japan .
216854 9/1941 Switzerland .

Primary Examiner—Richard A. Bertsch
Attorney, Agent, or Firm—Irving M. Weiner; Joseph P. Carrier; Pamela S. Burt

[57] ABSTRACT

A vehicle with a four-wheel steering device includes a vehicle frame, a pair of front wheels, a pair of rear wheels, and a steering link mechanism for simultaneously steering the front wheels and the rear wheels. The steering link mechanism is mounted on the vehicle frame. A first propeller shaft extends from an engine disposed between the front wheels to a gear transmission disposed between the rear wheels. A second propeller shaft extends from the gear transmission to a differential disposed between the front wheels in substantially parallel relation to the first propeller shaft, the second propeller shaft being vertically spaced from the first propeller shaft. The steering link mechanism is disposed between the vertically spaced first and second propeller shafts. The steering link mechanism includes front tie rods disposed behind the engine and operatively coupled to the front wheels and rear tie rods disposed one on each side of the gear transmission and operatively coupled to the rear wheels.

6 Claims, 7 Drawing Sheets

4,738,459

VEHICLE WITH FOUR-WHEEL STEERING DEVICE

BACKGROUND OF THE INVENTION

1. Field of the invention

The present invention relates to a vehicle, such as a rider-controlled working machine, having a four-wheel steering device.

2. Description of the Prior Art

Rider-controlled working machines such as agricultural machines and load carrying vehicles are required to have a small turning radius. To meet such a requirement, it has been proposed to steer front and rear wheels simultaneously in opposite directions as disclosed in Japanese Utility Model Publication No. 29-4015, U.S. Pat. Nos. 1,028,866 and 3,596,730, and Swiss Pat. No. 216,854.

The disclosed arrangements have a steering link mechanism partly disposed between the front wheels. Where an engine and a gear transmission are positioned between the front wheels, the steering link mechanism is disposed below the engine and the gear transmission and cannot be protected against interference with the road surface. In addition, difficulty is experienced with proper maintenance of the steering link mechanism thus located. If the steering link mechanism were positioned to be widely spaced from the road surface, then the height of the vehicle from the ground would be undesirably increased a corresponding amount.

The present invention has been made in an effort to eliminate the drawbacks of the conventional vehicles with four-wheel steering mechanisms.

SUMMARY OF THE INVENTION

Accordingly, it is an object of the present invention to provide a vehicle with a four-wheel steering device, such as a rider-controlled working machine, having an engine or a gear transmission disposed between a pair of transversely spaced wheels, the four-wheel steering device including a steering link mechanism positioned out of interference with the engine and the gear transmission and protected against interference with the road surface. The steering link mechanism being so positioned is easily serviced for maintenance.

Another object of the present invention is to provide a vehicle with a four-wheel steering device having a space large enough to accommodate the steering link mechanism therein without involving an increase in the height of the vehicle from the ground.

The above objects can be accomplished in a vehicle with a four-wheel steering device, including a vehicle frame, a pair of front wheels, a pair of rear wheels, a steering link mechanism disposed on the vehicle frame and interlinking the front and rear wheels for steering the front and rear wheels simultaneously, a steering shaft, and a gear box operatively coupled between the steering shaft and the steering link mechanism.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

The principles of the present invention are particularly useful when embodied in a four-wheel steering device in a rider-controlled working machine such as a tractor for agricultural use. However, the four-wheel steering device of the invention can also be usefully and desirably incorporated in other vehicles having a steering mechanism located centrally in the transverse direction of the vehicle.

Figure 1:
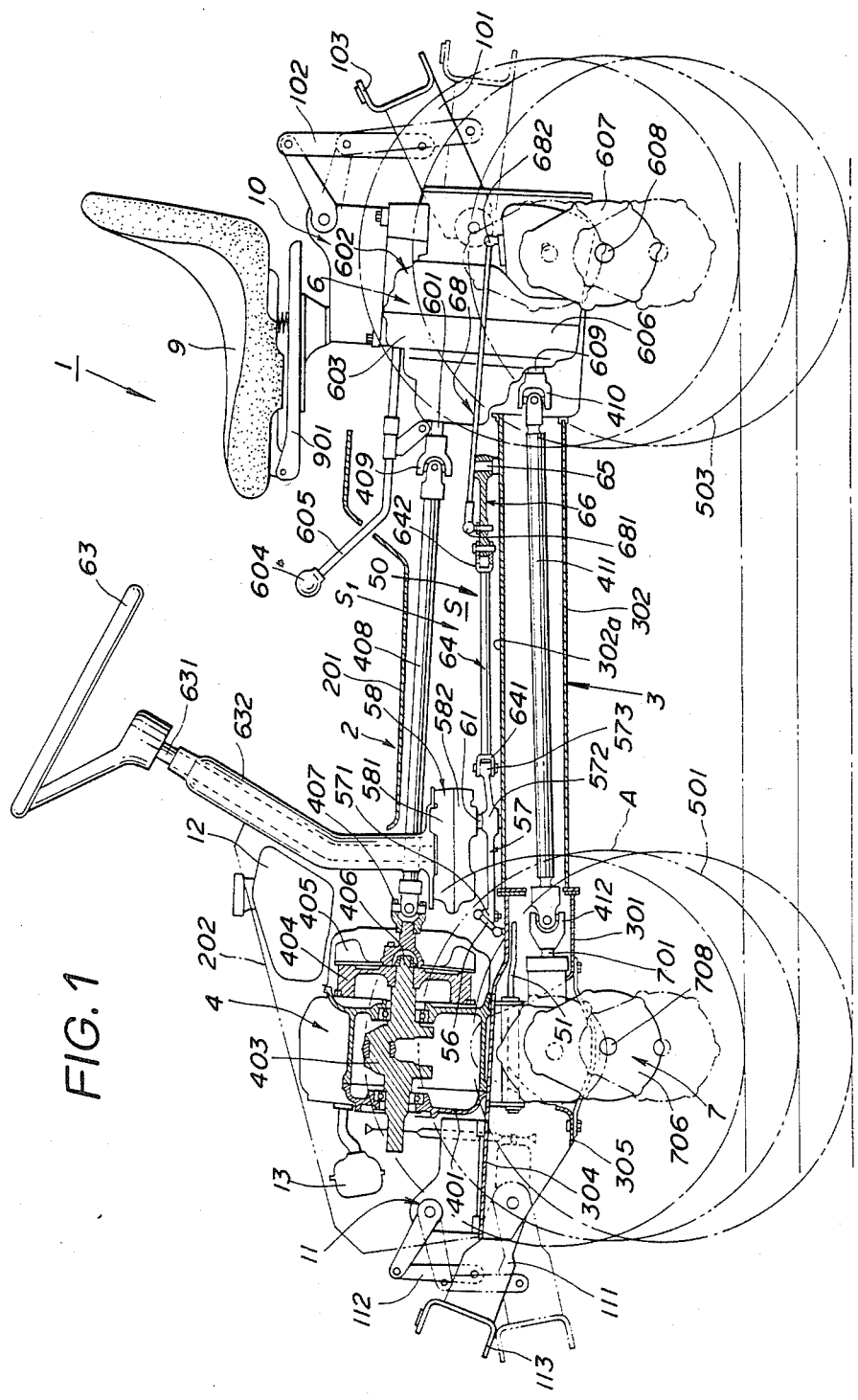
FIG. 1 is a side elevational view, partly in cross section, of a rider-controlled working machine or a tractor to which the present invention is applied.

As shown in FIG. 1, the tractor for agricultural use, generally deginated at 1, has a body 2 and a frame 3 of a box-shaped cross section centrally disposed below the body 2 in the transverse direction of the tractor. The frame 3, extends in the longitudinal direction of the tractor. The frame 3 is composed of a front portion 301 and a middle portion 302, the front portion 301 supporting an engine 4 thereon.

The engine 4 has a crankcase 401 in which there is disposed a crankshaft 403 extending in the longitudinal direction of the tractor 1. The rear end portion of the crankshaft 403 is connected to a flywheel 404 and a cooling fan 405 and has an output end 406 coupled through a joint 407 to a first upper propeller shaft 408 extending rearwardly. The first propeller shaft 408 extends below a floor 201 of the body 2 and is spaced upwardly from the frame 3. A space S having a certain vertical height is defined between the floor 201 and the frame 3. The first propeller shaft 408 is located closely to the lower surface of the floor 201, there being a large space S1 between the shaft 408 and an upper member 302a of a middle portion 302 of the frame 3.

Figure 2:
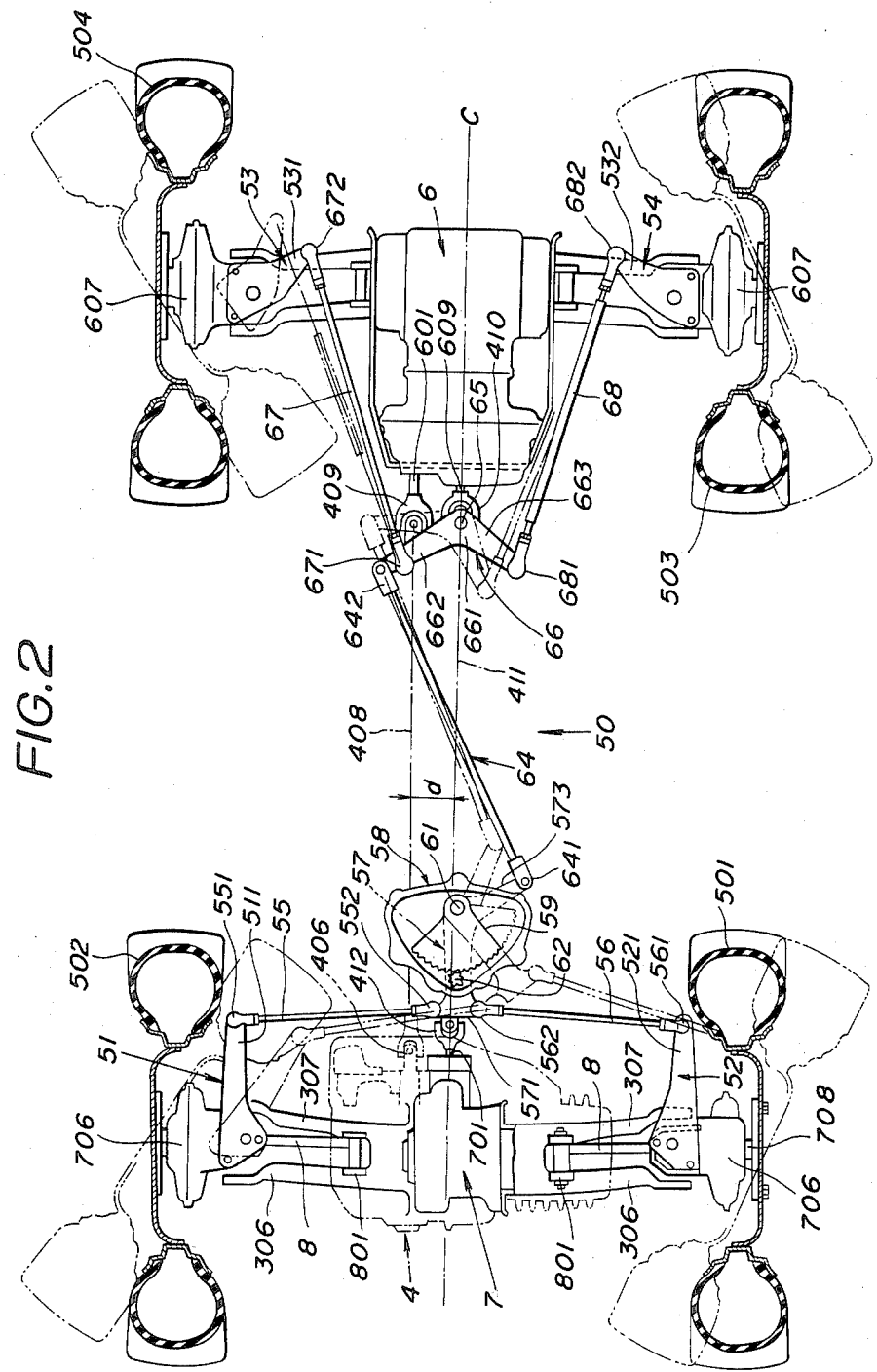
FIG. 2 is a plan view, partly in cross section, of a four-wheel steering device according to the present invention.

As illustrated in FIGS. 1 and 2, a pair of laterally spaced front wheels 501, 502 and a pair of laterally spaced rear wheels 503, 504 are supported on the front and rear ends of the body 2. The crankshaft 403 is partly positioned within the outer profile A (FIG. 1) of the front wheels 501, 502 as seen in side elevation. The front and rear wheels 501 through 504 are driven by a drive system as described below.

A gear transmission 6 is disposed in the rear portion of the body 2 and has an input shaft 601 to which the rear end of the first propeller shaft 408 is coupled through a joint 409. The gear transmission 6 includes a case 602 having an upper portion 603 from which extends a gear shift lever 605 projecting upwardly through the floor 201, which gear shift lever includes a front end extending upwardly and forwardly and having a knob 604. Speed reducer cases 607 are spaced laterally from the lower portion 606 of the case 602. The rear wheels 503, 504 are coupled to rear shafts 608 extending outwardly from the lower half portions of the speed reducer cases 607. The speed reducer cases 607 which support the rear wheels 503, 504 to drive them, are pivotally coupled to the frame 3 so that the rear wheels 503, 504 can be laterally steered.

Figure 3:
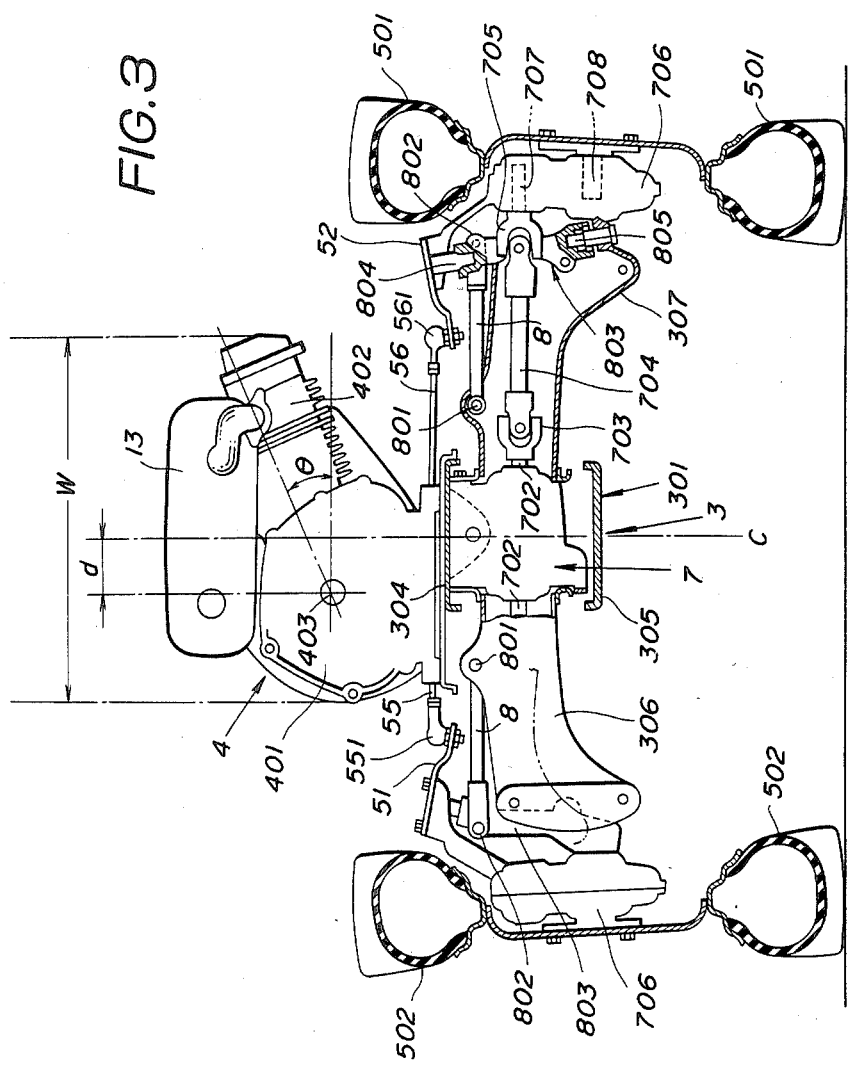
FIG. 3 is a front elevational view, partly in cross section, of a drive and steering system for front wheels.

An output shaft 609 projects from the front surface of the lower portion 606 of the transmission case 602 and faces the interior of the rear portion of the frame 3. The output shaft 609 is coupled to the rear end of a second lower propeller shaft 411 through a joint 410. The second propeller shaft 411 extends through a duct space 303 defined longitudinally in the vehicle frame 3, and has a front end coupled through a joint 412 to an input shaft 701 of a differential case 7. The differential case 7 is centrally disposed in the front portion 301 of the frame 3 which respect to both the longitudinal and transverse directions of the tractor 1. As shown in FIG. 3, the front portion 301 of the frame 3 is composed of thin channel-shaped members 304, 305 vertically spaced from each other in confronting relation. The differential case 7 being interposed between the channel-shaped members 304, 305.

Figure 4:
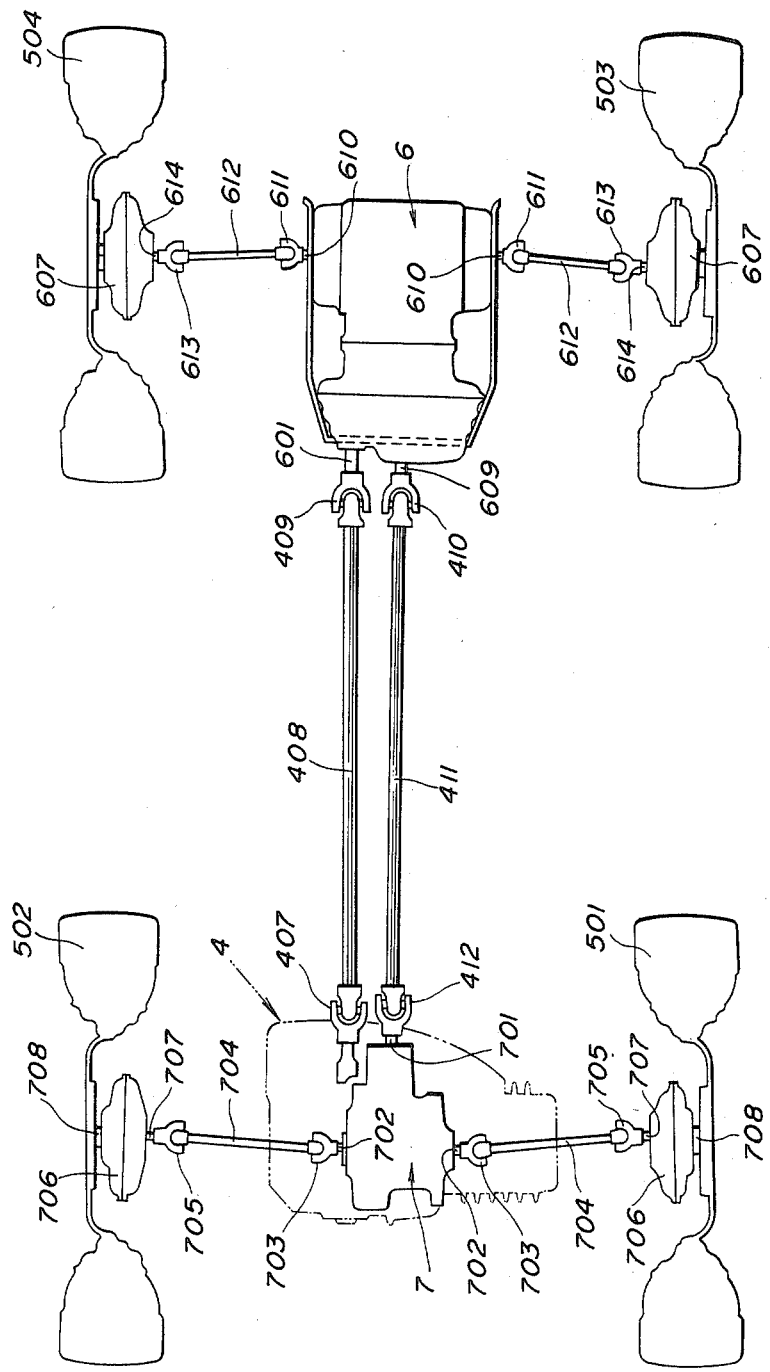
FIG. 4 is a plan view of a mechanism for transmitting engine power to four wheels.

Two output shafts 702, 702 project laterally from opposite sides of the differential case 7 and are coupled through universal joints 703, 703 to ends of drive axles 704, 704, respectively. The opposite ends of drive axles 704, 704 are coupled through universal joints 705, 705 to input shafts 707, 707 of a pair of laterally spaced speed reducer cases 706, 706, respectively. The speed reducer cases 706, 706 have output shafts 708, 708 connected to the front wheels 501, 502, respectively. The speed reducer cases 706, 706 are disposed between the front wheels 501, 502 and arms 306, 307. The inner ends of arms 306, 307 are coupled to the lateral sides of the differential case 7 and extend laterally outwardly. To the arms 306, 307 there are pivotally coupled first ends 801 of links 8, 8, which links extend laterally outwardly and have second ends 802 pivotally joined to kingpin units 803 of the speed reducer cases 706, 706, respectively. The front wheels 501, 502 are therefore vertically swingable, and also horizontally swingable about upper and lower kingpins 804, 805 of the kingpin units 803, respectively, so that the front wheels 501, 502 can also be steered. The rear wheels 503, 504 are similarly suspended from the frame 3. As shown in FIG. 4, the lateral output shafts 610, 610 of the gear transmission 6 are coupled through joints 611 to drive axles 612, 612, respectively, and coupled through joints 613 to the input shafts 614 of the speed reducer cases 607, for thereby transmitting engine power from the gear transmission 6 to the rear wheels 503, 504.

The wheels can be steered by a steering system or steering link mechanism 50 which is constructed as follows: As shown in FIG. 2, the speed reducer gears 706, 607 of the front wheels 501, 502 and the rear wheels 503, 504 are coupled to knuckle arms 51, 52, 53, 54, respectively. The knuckle arms 51, 52 for the front wheels 501, 502 have rear portions 511, 521 extending rearwardly parallel to each other and are pivotally joined by ball-and-socket joints to ends 551, 561 of tie rods 55, 56 extending behind the engine 4 and inwardly in the transverse direction of the tractor 1. The tie rods 55, 56 have ends 552, 562 positioned substantially centrally in the tractor body 2 and pivotally coupled to the lateral arms of a T-shaped front end 571 of a center arm 57 through ball-and-socket joints. Therefore, the tie rods 55, 56 are vertically swingable about the ends 552, 562 thereof. The center arm 57 extends over and across the joint between the middle portion 302 and the front portion 301 of the frame 3 as shown in FIG. 1, and has a steering gear box 58 mounted thereon. The steering gear box 58 is positioned above the frame 3 and below the first propeller shaft 408 and in the front portion of the space S.

Figure 5:
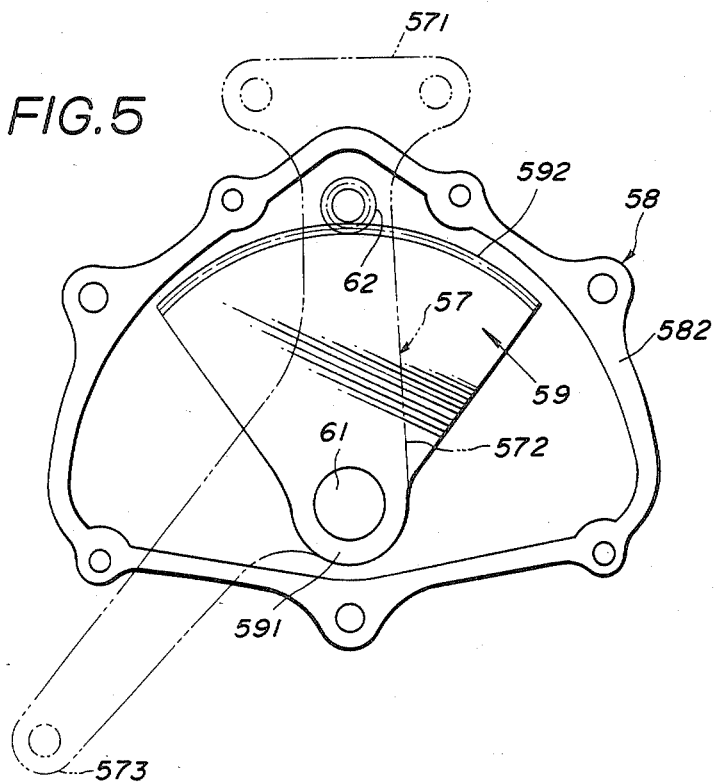
FIG. 5 is an enlarged plan view of a steering gear box.
Figure 6:
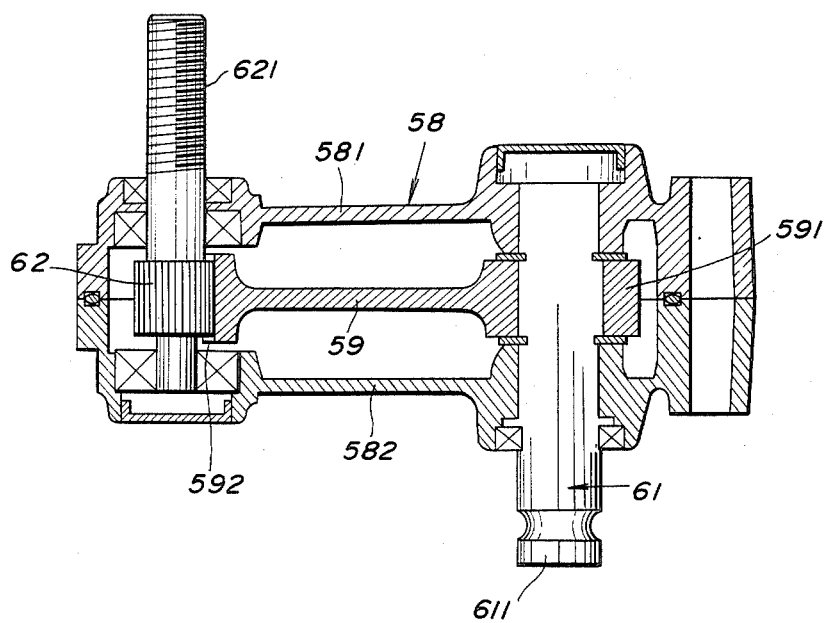
FIG. 6 is a vertical cross-sectional view of the steering gear box shown in FIG. 5.

As illustrated in FIGS. 5 and 6 at an enlarged scale, the steering gear box 58 is composed of an upper half member 581 and a lower half member 582 coupled together and accommodating a sector gear 59 therein. A vertical shaft 61 extending through and fixed to a bearing end 591 of the sector gear 59 extends downwardly through the bottom of the lower half member 582. The projecting lower end 611 of the vertical shaft 61 is fastened to an intermediate portion 572 of the center arm 57. A pinion 62 is also housed in the steering gear box 58 and held in mesh with the teeth of the sector gear 59. The pinion 62 has a shaft 621 projecting upwardly through the upper half portion 581 of the steering gear box 58, and is thereby coupled to a steering shaft 631 (FIG. 1) of a steering wheel 63, which steering wheel is centrally located on the front portion of the floor 201 in the transverse direction thereof. The steering shaft 631 extends downwardly through a steering post 632 which is attached to and projecting upwardly from the steering gear box 58. Therefore, the pinion 62 can be rotated about its own axis by turning the steering wheel 63.

As indicated by the two-dot-and-dash lines in FIG. 5, the center arm 57 is substantially J-shaped and has its rear end 573 extending rearwardly and laterally from the shaft 61 and pivotally coupled to the front end 641 (FIG. 2) of a connecting link 64. Referring back to FIGS. 1 and 2, a support pin 65 projecting upwardly from the rear portion of the frame 3 is centrally positioned in front of the gear transmission 6 in the transverse direction of the tractor 1. A V-shaped rear center arm 66 has its central portion 661 pivotally joined to the support pin 65. The rear center arm 66 has arms 662, 663 extending laterally and forwardly from the support pin 65 and having different lengths. The longer arm 662 has an end pivotally coupled to the rear end 642 of the connecting link 64. The connecting link 64 is inclined with respect to the longitudinal central axis of the tractor 1 and crosses the same substantially centrally in the longitudinal direction of the tractor 1, such that the front end of the connecting link 64 is located on one side of tractor axis while the rear end thereof is located on the other side. The longer arm 662, at a portion slightly inward of the end thereof, and the shorter arm 663, at its end, are pivotally coupled by ball-and-socket joints to front ends 671, 681 of a pair of laterally spaced tie rods 67, 68, respectively. The support pin 65 is spaced equidistantly from the joints of the arms 662, 663 with respect to the tie rods 67, 68. The tie rods 67, 68 extend farther away from each other in the rearward direction alongside of the gear transmission 6. The tie rods 67, 68 have rear ends 672, 682 pivotally coupled by ball-and-socket joints to ends 531, 532 of the knuckle arms 53, 54, which extend toward the gear transmission 6. The steering system 50 including the connecting link 64 is installed in the space S between the frame 3 and the floor 201 and between the upper and lower propeller shafts 408, 411. The space S has a sufficient vertical height, and accommodates the tie rods 55, 56, 67, 68 in its front and rear portions. The tie rods 67, 68 are vertically swingable about their front ends 671, 681.

As described above, the four front and rear wheels 501 through 504 are simultaneously drivable and steerable. More specifically, as shown in FIG. 4, the engine power generated by the engine 4 and transmitted via the propeller shaft 408 is delivered through the gear transmission 6 and then through the drive systems 610 through 614 to the speed reducer cases 607 for driving the rear wheels 503, 504. The engine power is also delivered from the gear transmission 6 through the propeller shaft 411 to the front differential case 7, from which the engine power is delivered through the drive systems 702 through 707 to the speed reducer cases 706 for driving the front wheels 501, 502. The four wheels are therefore driven at the same time.

When the steering wheel 63 is turned clockwise or counterclockwise as shown in FIG. 2, the pinion 62 is turned clockwise or counterclockwise about its own axis to turn the center arm 57 about the support shaft 61 through the sector gear 59. When the center arm 57 is turned counterclockwise, for example, the tie rods 55, 56 are moved leftwardly to cause the front wheels 501, 502 to turn or steer clockwise about the kingpins 804, 805. At the same time, the counterclockwise angular movement of the arm 57 pushes the connecting link 64 rearwardly to turn the rear center arm 66 clockwise about the pin 65. Therefore, the tie rod 67 is pushed rearwardly to push the knuckle arm 53 counterclockwise and the tie rod 68 is pulled forwardly to pull the knuckle arm 54 counterclockwise. Thus, the rear wheels 503, 504 are turned or steered in a direction opposite to the direction in which the front wheels 501, 502 are steered. With the front and rear wheels steerable in the opposite directions, the front wheels 501, 502 and the rear wheels 503, 504 may be substantially the same diameter, which is normally relatively large, and the radius of rotation of the front and rear wheels of a smaller than possible with conventional front wheels of a smaller diameter even if the front wheels 501, 502 are steered through a small steering angle. Therefore, the front wheels 501, 502, of even a relatively large diameter, do not interfere with the front portion of the tractor body.

The front tie rods 55, 56 are disposed behind the engine 4 and moved laterally by the center arm 57 on the centrally located steering gear box 58. With this arrangement, the tie rods 55, 56 are tilted through only small intervals, as seen in plan, as they are pushed and pulled in steering the front wheels. As a result, the tie rods 55, 56 are protected from interfering with the engine 4. With the rear wheels steerable at the same time in the opposite direction, the front wheels can effectively and efficiently be steered while avoiding interference or contact with the engine and surrounding parts.

The rear tie rods 67, 68 extend obliquely farther away from each other toward their rear ends alongside of the gear transmission 6. As they are pushed and pulled by the V-shaped rear center arm 66, they are moved substantially linearly along their own axes and displaced only small intervals in the transverse direction of the tractor, thereby preventing interference or contact with the gear transmission 6.

The four-wheel steering mechanism can thus be operated without interference or contact with the engine and the transmission.

As shown in FIG. 3, the engine 4 has a cylinder 402 inclined toward the front wheel 502 (on the righthand side as shown) through an angle $\theta$ from the horizon. The crankshaft 403 is laterally offset or displaced a distance d from the transversely central line C of the tractor body, with the crankcase 401 mounted on the frame 3. As shown in FIG. 1, the crankshaft 403 is located at a position upward of the steering gear box 58. Inasmuch as the engine cylinder 402 is slanted to one side, the overall height of the engine 4 is low and hence an engine hood 202 can be lowered to give the driver a wide front view. The crankshaft 403 is offset the distance d from the central line C remotely from the engine cylinder 402. Consequently, the center of the width W of the engine 4 is substantially aligned with the central line C, and the engine does not project laterally toward one of the front wheels. As a result, the front wheels 501, 502 as they are steered are well balanced and their steering angle can be sufficiently large. Since the center of gravity of the inclined engine 4 is substantially aligned with the center of its width, the weight of the engine 4 is also well balanced.

As illustrated in FIG. 2, the input shaft 601 of the gear transmission 6 is also offset or displaced the distance d laterally from the central line C, and the first propeller shaft 408, by which the input shaft 601 and the crankshaft 406 are interconnected, is positioned on one side of the steering post 632 aligned with the central line C. The transmission output shaft 609 and the differential input shaft 701 are disposed downwardly of the connecting link 64 (FIG. 1) in substantial alignment with the central line C, and are interconnected by the second propeller shaft 411.

Since the propeller shaft 408 is positioned on one side of the steering post 632 projecting from the steering gear box 58 in alignment with the central line C, the propeller shaft 408 and the steering gear box 58 are out of interference with each other, and can be arranged in a compact fashion. This arrangement minimizes any upward protrusion from the floor 201 to give the driver a wide foot space.

The rider-controlled working machine of the foregoing construction can be operated effectively and efficiently.

Figure 7:
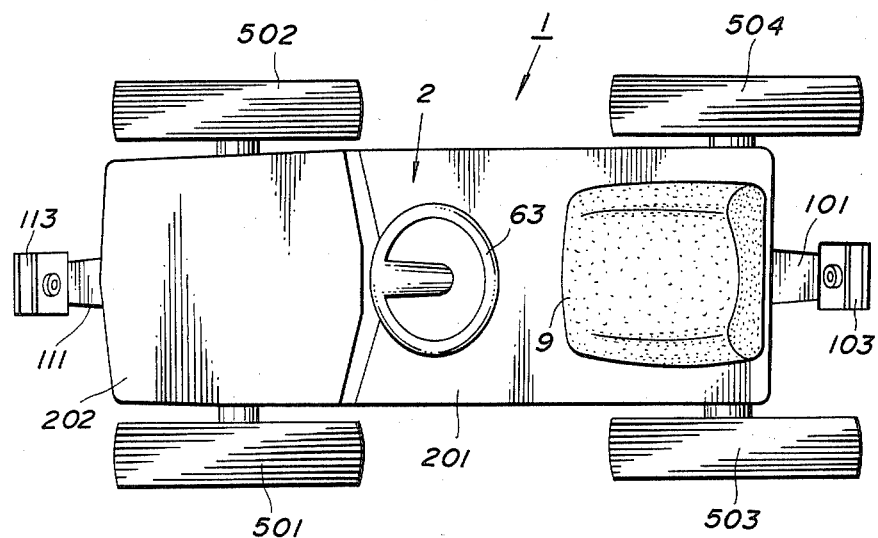
FIG. 7 is a schematic plan view of the tractor illustrated in FIG. 1.

As shown in FIGS. 1 and 7, the steering wheel 63 is disposed on the central line C centrally in the longitudinal direction of the tractor 1. A single driver's seat 9 is disposed behind the steering wheel 63. The driver's seat 9 is mounted by a support plate 901 on a hydraulic cylinder unit 10 attached to the upper surface of the gear transmission 6. A rear hitch frame 101 having a rear hitch 103 is pivotally attached to the case 602 of the gear transmission 6 and extends rearwardly. The rear hitch frame 101 is vertically swingable by the hydraulic cylinder unit 10 through a link 102 and an arm 105, and is connected to a rotor or another device, not shown. A hydraulic cylinder unit 11 is mounted on the upper front portion of an upper member 304 of the frame front portion 301. A front hitch frame 111 having a front hitch 113 is pivotally mounted on a gear case 15 disposed below the hydraulic cylinder unit 11. The front hitch frame 111 is vertically swingable by the hydraulic cylinder unit 11 through a link 112 and an arm 115. Like the rear hitch 103, the front hitch 113 is connected to a rotor or another device, not shown.

As illustrated in FIG. 1, the engine 4 is supplied with fuel from a fuel tank 12 and discharges an exhaust gas through a muffler 13.

All of the four wheels 501 through 504, including the speed reducer cases, can be adjusted in height with respect to the frame 3 to allow height adjustment of the tractor 1.

Figure 8:
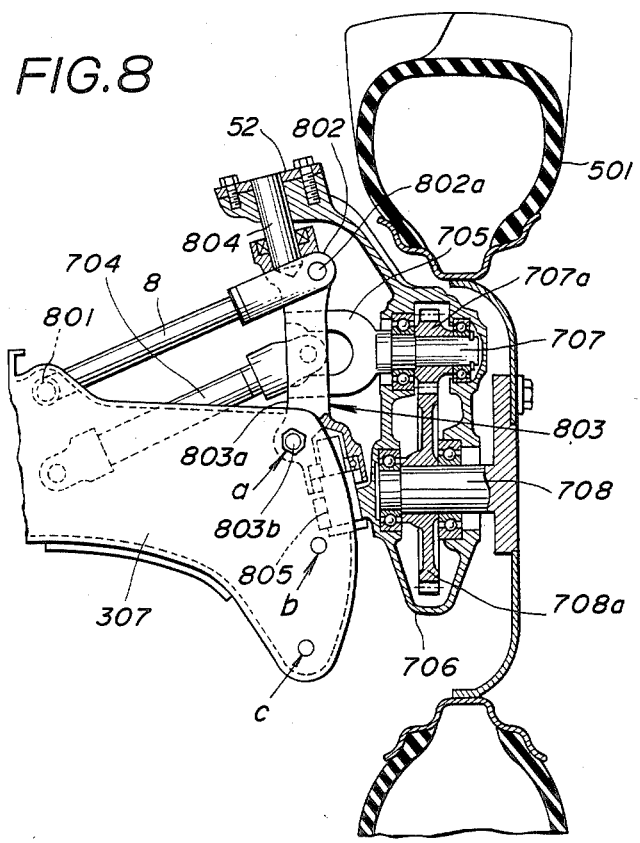
FIG. 8 is an enlarged fragmentary vertical cross-sectional view of a lefthand front wheel, explanating the manner in which the vehicle height is adjusted.

FIG. 8 shows the righthand front wheel 501 by way of example for such height adjustment. The kingpin unit 803 has a base comprising a rod 803a, which rod has an upper portion pivotally connected by a pin 802a to the end 802 of the link 8 and a lower portion pivotally connected by a pin 803b to an upper portion of the outer end of the arm 307. The arm 307 has an upper portion a, a middle portion b, and a lower portion c, each of which can selectively be pivotally connected to the lower portion of the rod 803a through the pin 803b. As illustrated, the upper portion a is connected to the rod 803a to provide a lowest height for the tractor 1. However, the middle portion b or the lower portion c may be selected to give a middle or a highest tractor height. FIG. 3 shows that the middle tractor height is selected. The height adjustment mechanisms associated with the other wheels are identical in construction, so that all of the four wheels can be adjusted to give three different tractor heights. The height adjustement is especially advantageous to permit the tractor 1 to travel rough terrain such as a farmland.

As shown in FIG. 8, the speed reducer case 706 houses speed reducer gears 707a, 708a meshing with each other for transmitting the engine power from the input shaft 707 to the output shaft 708 through speed reduction.

The present invention offers many advantages, including the following:

The steering link mechanism or system which interlinks the front and rear wheels for steering them is mounted on the frame and not exposed directly toward the road surface or ground. Therefore, the link mechanism is protected against collision with bumps on the ground or objects flying therefrom, and is not required to be protected by a special guard member.

Inasmuch as the steering link mechanism is disposed in the large space below the floor and above the frame and between the upper and lower propeller shafts, the steering link mechanism can easily be serviced simply by detaching the floor. Further even though the height of the tractor from the ground may be selectively changed, the space in which the steering link mechanism is situated and operates remains unchanged. As the space accommodating the steering link mechanism is large, a steering gear box of a relatively large size can be housed in this space without undesirably increasing the size thereof. Since the steering link mechanism is located vertically between the upper and lower spaced propeller shafts, the widths of steps on the opposite sides of the floor can be increased.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A vehicle with a four-wheel steering device, comprising:
   a vehicle frame;
   a vehicle body place on said vehicle frame and having a floor portion;
   a pair of front wheels supported by said vehicle body;
   a pair of rear wheels supported by said vehicle body;
   an engine disposed between one of said pairs of front wheels and rear wheels;
   a gear transmission disposed between the other pair of wheels;
   a steering link mechanism for interlinking said front and rear wheels to steer the front and rear wheels simultaneously;
   a steering shaft; and
   a gear box operatively coupled between said steering shaft and said steering link mechanism;
   said steering link mechanism being positioned in a space defined between said frame and said floor portion of the vehicle body, so that said steering link mechanism is not exposed directly to a road surface or ground.

2. A vehicle with a four-wheel steering device, comprising:
   a vehicle frame;
   a pair of front wheels;
   a pair of rear wheels;
   an engine and a differential disposed between one of the pairs of said front wheels and said rear wheels;
   a gear transmission disposed between the other wheel pair;
   a gear transmission disposed between the other wheel pair;
   a first propeller shaft extending from said engine to said gear transmission, and a second propeller shaft extending from said gear transmission to said differential in substantially parallel relation to said first propeller shaft;
   a steering link mechanism disposed on said vehicle frame and interlinking said front and rear wheels for steering the front and rear wheels simultaneously;
   a steering shaft; and
   a gear box operatively coupled between said steering shaft and said steering link mechanism;
   said first and second propeller shafts being vertically spaced from each other and isolated from each other by a portion of said vehicle frame; and
   said steering link mechanism being disposed between said first and second propeller shafts.

3. A vehicle according to claim 2, wherein said vehicle frame has a hollow portion extending longitudinally thereof, said second propeller shaft extending through said hollow portion of the vehicle frame.

4. A vehicle according to claim 2, including a vehicle body on said vehicle frame, and wherein said steering shaft and said gear box are positioned substantially centrally in the transverse direction of said vehicle body, said engine being positioned between said front wheels, said first propeller shaft which extends from said engine being disposed upwardly of said gear box and laterally of said steering shaft.

5. A vehicle according to claim 4, wherein said engine has a cylinder and an output shaft extending in the longitudinal direction of said vehicle body, said cylinder being inclined to one side of said vehicle body, and said output shaft being offset from a central line of said vehicle body remotely from said cylinder.

6. A vehicle with a four-wheel steering device, comprising:
   a vehicle frame;

a vehicle body on said vehicle frame;
a pair of front wheels;
a pair of rear wheels;
an engine disposed between one of the pairs of said front wheels and said rear wheels;
a gear transmission disposed between the other wheel pair;
a steering link mechanism disposed on said vehicle frame and interlinking said front and rear wheels for steering the front and rear wheels simultaneously;
a steering shaft; and
a gear box operatively coupled between said steering shaft and said steering link mechanism;
said steering link mechanism including a pair of front tie rods operatively coupled to said front wheels and a pair of rear tie rods operatively coupled to said rear wheels, said front tie rods extending substantially transversely of said vehicle body behind said engine or said gear transmission disposed between said front wheels, and said rear tie rods extending rearwardly one on each side of said gear transmission or said engine disposed between said rear wheels.

* * * * *

UNITED STATES PATENT AND TRADEMARK OFFICE
CERTIFICATE OF CORRECTION

PATENT NO. : 4,738,459
DATED : April 19, 1988
INVENTOR(S) : NAKAMURA et al.

It is certified that error appears in the above-identified patent and that said Letters Patent is hereby corrected as shown below:

Column 2, line 19, change "explanating" to --explaining--.
Column 5, line 39, after "wheels" change "of a" to --is--.
Column 8, line 1 (claim 1, line 4), change "place" to --placed--;
    lines 29-30 (claim 2, lines 10-11), delete both entire lines.

Signed and Sealed this

Twentieth Day of September, 1988

Attest:

DONALD J. QUIGG

Attesting Officer

Commissioner of Patents and Trademarks